United States Patent
Wigsten et al.

(10) Patent No.: US 9,874,267 B2
(45) Date of Patent: Jan. 23, 2018

(54) SERIES ARRANGEMENT OF HYDRAULIC CHAIN TENSIONER AND RATCHET

(71) Applicant: BorgWarner Inc., Auburn Hills, MI (US)

(72) Inventors: Mark M. Wigsten, Lansing, NY (US); Dale N. Smith, Freeville, NY (US)

(73) Assignee: BORGWARNER INC., Auburn Hills, MI (US)

( * ) Notice: Subject to any disclaimer, the term of this patent is extended or adjusted under 35 U.S.C. 154(b) by 127 days.

(21) Appl. No.: 14/891,029

(22) PCT Filed: May 15, 2014

(86) PCT No.: PCT/US2014/038063
§ 371 (c)(1),
(2) Date: Nov. 13, 2015

(87) PCT Pub. No.: WO2014/189745
PCT Pub. Date: Nov. 27, 2014

(65) Prior Publication Data
US 2016/0084359 A1    Mar. 24, 2016

Related U.S. Application Data

(60) Provisional application No. 61/827,538, filed on May 24, 2013.

(51) Int. Cl.
*F16H 7/22*     (2006.01)
*F16H 7/08*     (2006.01)

(52) U.S. Cl.
CPC ......... *F16H 7/0836* (2013.01); *F16H 7/0848* (2013.01); *F16H 2007/0806* (2013.01);
(Continued)

(58) Field of Classification Search
CPC ..... F16H 2007/0806; F16H 2007/0859; F16H 7/0848; F16H 2007/0812; F16H 2007/0853
(Continued)

(56) References Cited

U.S. PATENT DOCUMENTS 4,040,305 A * 8/1977 Cadic ................. F16H 7/08
                                                 474/135
4,291,416 A * 9/1981 Hoeptner, III ......... F02B 67/06
                                                 188/67
(Continued)

FOREIGN PATENT DOCUMENTS

| CN | 201836313 U | 5/2011 |
|---|---|---|
| JP | H 10-061737 A | 3/1998 |
| JP | 2008-303974 A | 12/2008 |

OTHER PUBLICATIONS

International Search Report for Application No. PCT/US2014/038063 dated Sep. 17, 2014, 2 pages.
(Continued)

*Primary Examiner* — Henry Liu
(74) *Attorney, Agent, or Firm* — Howard & Howard Attorneys PLLC

(57) ABSTRACT

A tensioner (10) for an endless loop power transmission member can induce a piston (12) operably engageable with an endless loop power transmission member, and a cylinder (14) guiding include a piston (12) for sliding coaxial movement in a direction of the endless loop power transmission member. The piston (12) and cylinder (14) defining an oil reservoir or pressure chamber (26) for receiving hydraulic fluid. A bearing (28) has bearing balls (30) located in a counter bore (32) coaxial with cylinder bore (34). The counter bore (32) has a steep taper (36) on which the bearing balls (30) ride. As the cylinder (14) moves in an extending direction, the bearing balls (30) move out of the counter bore
(Continued)

(32) allowing free extending movement of the cylinder (14). As the cylinder (14) moves in a retracting direction, the bearing balls (30) are driven down into the steep taper (36) preventing the cylinder (14) from retracting.

19 Claims, 1 Drawing Sheet

(52) U.S. Cl.
CPC ............... *F16H 2007/0812* (2013.01); *F16H 2007/0817* (2013.01); *F16H 2007/0851* (2013.01); *F16H 2007/0853* (2013.01)

(58) Field of Classification Search
USPC ........................................................ 474/110
See application file for complete search history.

(56) References Cited

U.S. PATENT DOCUMENTS

| | | | | |
|---|---|---|---|---|
| 4,416,648 A * | 11/1983 | Radocaj | ............... | F16H 7/1272 474/135 |
| 4,457,741 A * | 7/1984 | Hoeptner, III | .......... | F02B 67/06 188/67 |
| 4,761,155 A * | 8/1988 | Kinoshita | ............... | F02B 67/06 474/104 |
| 5,197,573 A * | 3/1993 | De La Fuente | ........... | F16F 7/02 188/129 |
| 5,304,099 A * | 4/1994 | Deppe | ................... | F16H 7/0848 474/110 |
| 5,913,742 A * | 6/1999 | Nakamura | ............ | F16H 7/0848 474/110 |
| 6,139,454 A * | 10/2000 | Simpson | ............... | F16H 7/0848 474/109 |
| 6,193,623 B1 * | 2/2001 | Koch | .................... | F16H 7/0836 474/110 |
| 6,244,982 B1 * | 6/2001 | Merelli | ..................... | F16H 7/08 188/277 |
| 6,322,468 B1 * | 11/2001 | Wing | ........................ | F16H 7/08 474/109 |
| 6,361,458 B1 * | 3/2002 | Smith | ................... | F16H 7/0848 474/109 |
| 6,412,606 B1 * | 7/2002 | Wu | ........................ | F16F 7/082 188/266 |
| 6,685,587 B2 * | 2/2004 | Rossato | ................ | F16H 7/0848 474/109 |
| 6,935,978 B2 * | 8/2005 | Hayakawa | ............ | F16H 7/0836 474/109 |
| 7,037,228 B2 * | 5/2006 | Yoshida | ................ | F16H 7/0848 474/109 |
| 7,048,662 B2 * | 5/2006 | Maino | ................... | F16H 7/0848 474/109 |
| 7,455,606 B2 * | 11/2008 | Markley | ............... | F16H 7/0848 474/109 |
| 7,775,924 B2 * | 8/2010 | Koch | .................... | F16H 7/0848 251/337 |
| 7,850,559 B2 * | 12/2010 | Botez | ................... | F16H 7/0848 474/101 |
| 8,419,575 B2 * | 4/2013 | Yoshida | ................ | F16H 7/0848 474/109 |
| 8,523,720 B2 | 9/2013 | Reinhart et al. | | |
| 8,951,154 B2 * | 2/2015 | Konuma | ............... | F16H 7/0848 474/110 |
| 9,360,088 B2 * | 6/2016 | Todd | .......................... | F16H 7/08 |
| 9,377,088 B2 * | 6/2016 | Todd | .......................... | F16H 7/08 |
| 2003/0114260 A1 * | 6/2003 | Seungpyo | ............. | F16H 7/0848 474/110 |
| 2003/0125143 A1 * | 7/2003 | Seungpyo | ............. | F16H 7/0848 474/110 |
| 2003/0186764 A1 * | 10/2003 | Yoshida | ................ | F16H 7/0848 474/109 |
| 2003/0236144 A1 * | 12/2003 | Seungpyo | ............. | F16H 7/0848 474/110 |
| 2005/0197223 A1 * | 9/2005 | Namie | .................. | F16H 7/0848 474/110 |
| 2005/0239589 A1 * | 10/2005 | Seungpyo | ............. | F16H 7/0836 474/110 |
| 2006/0063625 A1 * | 3/2006 | Emizu | .................... | F16H 7/0836 474/110 |
| 2006/0160645 A1 * | 7/2006 | Markley | ............... | F16H 7/0848 474/109 |
| 2006/0166769 A1 * | 7/2006 | Yoshida | ................ | F16H 7/0831 474/110 |
| 2006/0293133 A1 * | 12/2006 | Simpson | ............... | F16H 7/0848 474/109 |
| 2007/0243961 A1 * | 10/2007 | Aimone | ................ | F16H 7/0836 474/109 |
| 2008/0280712 A1 * | 11/2008 | Ryouno | ................ | F16H 7/0836 474/110 |
| 2008/0318717 A1 * | 12/2008 | Kurematsu | ........... | F16H 7/0848 474/110 |
| 2009/0111628 A1 * | 4/2009 | Poiret | ................... | F16H 7/0848 474/110 |
| 2009/0209378 A1 * | 8/2009 | Kurematsu | ........... | F16H 7/0836 474/110 |
| 2009/0247336 A1 * | 10/2009 | Bongard | ................ | F01L 1/022 474/110 |
| 2010/0298077 A1 * | 11/2010 | Hirayama | ................ | F01L 1/02 474/110 |
| 2011/0081997 A1 * | 4/2011 | Markely | ............... | F16H 7/0848 474/110 |
| 2011/0183796 A1 * | 7/2011 | Kurematsu | ........... | F16H 7/0848 474/110 |
| 2011/0269584 A1 * | 11/2011 | Yoshida | ................ | F16H 7/0848 474/101 |
| 2012/0309570 A1 * | 12/2012 | Kurematsu | ........... | F16H 7/0848 474/110 |
| 2013/0288836 A1 * | 10/2013 | Kurematsu | ........... | F16H 7/0836 474/110 |
| 2014/0179471 A1 * | 6/2014 | Markley | ............... | F16H 7/0836 474/110 |
| 2014/0187369 A1 * | 7/2014 | Todd | .......................... | F16H 7/08 474/110 |
| 2015/0240918 A1 * | 8/2015 | Emizu | ..................... | F01L 1/024 474/110 |

OTHER PUBLICATIONS

English language abstract and machine-assisted English translation for JPH 10-061737 extracted from PAJ database dated Dec. 14, 2016, 12 pages.

English language abstract and machine-assisted English translation for JP 2008-303974 extracted from espacenet.com database dated Dec. 14, 2016, 16 pages.

English language abstract for CN 201836313 extracted from espacenet.com database dated Jul. 5, 2017, 1 page.

* cited by examiner

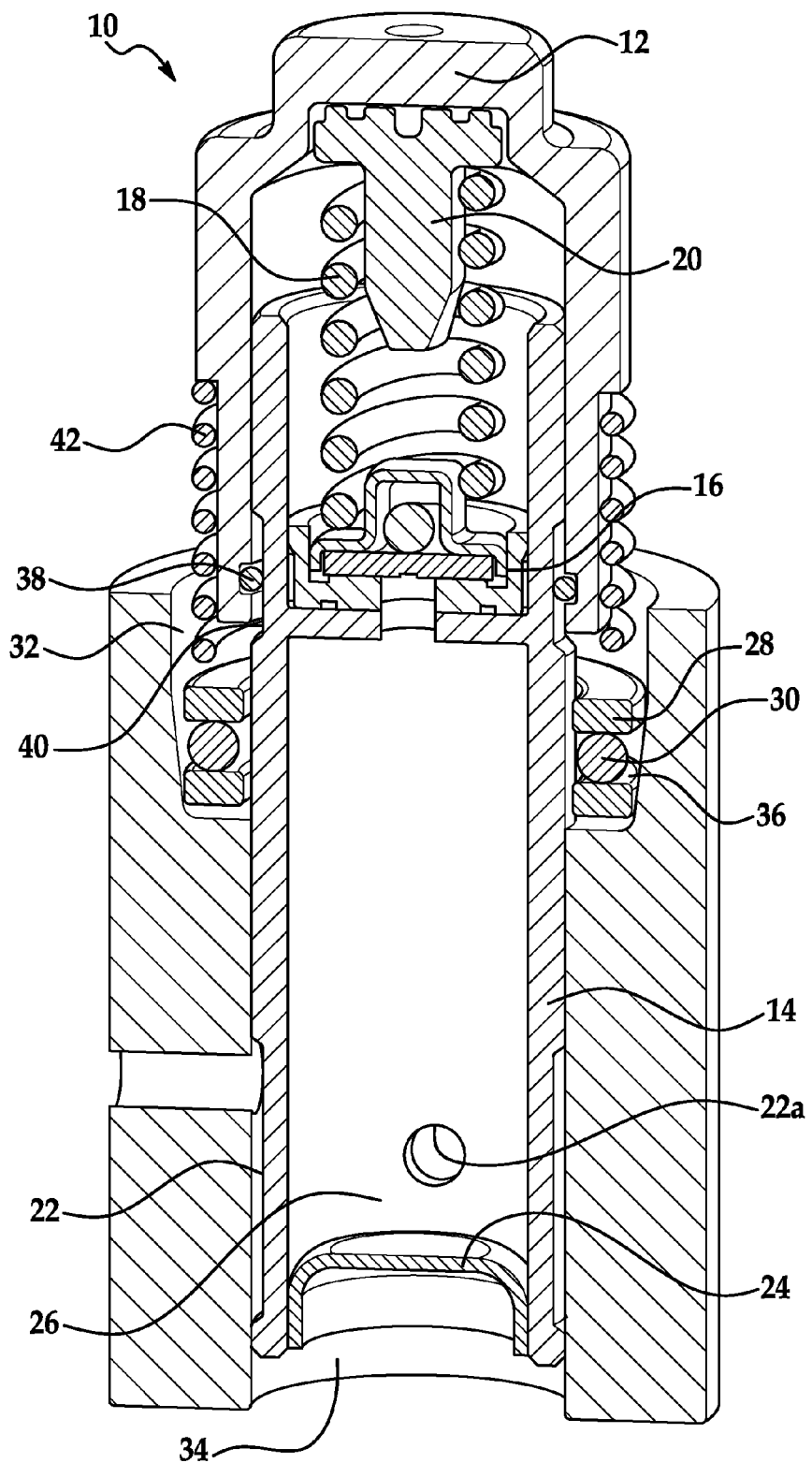

SERIES ARRANGEMENT OF HYDRAULIC CHAIN TENSIONER AND RATCHET

FIELD OF THE INVENTION

The invention relates to a tensioner, and more particularly to an endless loop power transmission member tensioner as used in endless loop power transmission drives of internal combustion engines for tensioning the endless loop power transmission member during operation.

BACKGROUND

Timing drive tensioners are designed to control timing drive dynamic inputs transmitted through the chain and ultimately the tensioner arm/face. In order to achieve this control, tensioners are 'tuned' via mechanical, hydraulic or a combination of both methods. As the chain wears, a typical tensioner piston extends as designed to take up chain slack. Piston extension reduces mechanical bias spring force and can increase hydraulic leakage changing the tensioner tuning. This change in tuning during the life cycle of the tensioner can be compensated for by over-tensioning the tensioner when the tensioner is new to compensate for piston extension during the worn chain portion of the life cycle. Over-tensioning of the tensioner has an adverse effect on efficiency and system durability.

A necessary function of a tensioner is to extend to take up chain slack as the chain wears. In a conventional tensioner, chain take up increases compression spring length reducing chain preload requiring excessive preload at new chain conditions to compensate, which adversely effects efficiency and system durability.

SUMMARY

A tensioner for an endless loop power transmission member can include an assembly of a piston operably engageable with an endless loop power transmission member, and a cylinder guiding the piston for sliding coaxial movement in a direction of the endless loop power transmission member and defining an oil reservoir for receiving hydraulic fluid. A bearing can include bearing balls located in a counter bore coaxial with cylinder bore. The counter bore can have a steep taper on which the bearing balls ride, such that as the cylinder moves in an extending direction, the bearing balls move out of the counter bore allowing free extending movement of the cylinder, and such that as the cylinder moves in a retracting direction, the bearing balls are driven down into the steep taper preventing the cylinder from retracting.

The tensioner can include two springs, a first spring serving to bias the piston away from the cylinder and a second spring serving to bias the cylinder away from the bearing and bore. The tensioner can be designed such that the assembled load of the first spring is always greater than the assembled load of the second spring. The piston, cylinder, reservoir, check valve, and vent can act as a conventional hydraulic tensioner providing spring force, force from oil pressure, and hydraulic damping to the endless loop power transmission.

The travel of the piston relative to the cylinder can be limited to a distance that is smaller than the total travel required by the tensioner for complete take-up of system wear. A circular clip can be retained within a groove in the inside diameter of the piston. A groove can be formed in the cylinder. The groove of given width on the cylinder in which the circular clip rides can correspond to a distance at least equal to the minimum required backlash of the tensioner. An end wall of the groove can come into contact with the circular clip during extending movement, such that when the piston has fully extended relative to the cylinder, the spring force from the first spring no longer reacts against the chain, but the second spring can push the cylinder and piston outward relative to the bearing and bore. The short travel hydraulic portion of the tensioner is thereby re-positioned outward as the system wears.

The disclosed tensioner makes use of a short travel hydraulic tensioner arranged in series with a zero pitch/zero backlash ratchet mechanism. A typical chain tensioner will use a hydraulic tensioner in parallel with a ratchet. This tensioner has the hydraulic function riding along on top of the ratchet. The travel of the hydraulic parts can be much lower than the overall travel of the tensioner needs to be, so the design of the spring between the piston and cylinder is easier. The benefit is that the load can be more consistent. Also, the length of the hydraulic leak path never changes. With a typical tensioner, the farther the tensioner moves out the shorter the leak path becomes. This tensioner provides a configuration where the two springs are designed so that the zero backlash ratchet will never extend while the hydraulic part of the tensioner is compressed. If the zero backlash ratchet did extend, the tensioner would end up with insufficient backlash and a "locked-up" timing drive.

Other applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein:

FIG. 1 is a cross sectional view of a series arrangement of a hydraulic chain tensioner and a ratchet.

DETAILED DESCRIPTION

Referring now to FIG. 1, a tensioner 10 for an endless loop power transmission member can include an assembly of a piston 12 operably engageable with an endless loop power transmission member, and a cylinder 14 guiding the piston 12 for sliding coaxial movement in a direction of the endless loop power transmission member and defining an oil reservoir 26 for receiving hydraulic fluid. A bearing 28 can have bearing balls 30 located in a counter bore 32 coaxial with cylinder bore 34. The counter bore 32 can have a steep taper 36 on which the bearing balls 30 ride, such that as the cylinder 14 moves in an extending direction, the bearing balls 30 move out of the counter bore 32 allowing free extending movement of the cylinder 14, and as the cylinder 14 moves in a retracting direction, the bearing balls 30 are driven down into the steep taper 36 preventing the cylinder 14 from retracting.

A circular clip 38 can be retained within a groove in the inside diameter (ID) of the piston 12. The cylinder 14 can have a groove 40 of given width located on an outside diameter (OD) of the cylinder 14 in which the circular clip 38 rides. The given width of the groove 40 can correspond to an allowable backlash for the tensioner 10. An end wall of the groove 40 can come into contact with the circular clip 38 during extending movement, such that when the piston has fully extended relative to the cylinder the circular clip 38 pulls the cylinder 14 outward relative to the bearing 28 and bore 34 resulting in endless loop power transmission take-up.

A check valve 16 can be located between the piston 12 and cylinder 14. A piston spring 18 can be located between the piston 12 and cylinder 14. An optional flow control device 20 can be located between the piston and cylinder 14. The check valve 16, piston spring 18, and optional flow control device 20 can cooperate to provide a hydraulic tensioner functions.

An oil groove 22 can be formed within the bore 34 of the cylinder 14. The oil groove 22 can be formed as an annulus allowing for consistent oil feed as the cylinder 14 moves without creating a hydraulic bias on the cylinder 14. The oil groove 22 can have an oil feed aperture 22a extending in fluid communication to a center of the cylinder 14. A plug 24 can be pressed into an end of the cylinder 14 forming the oil reservoir 26 of the tensioner 10. The oil reservoir 26 can be fed through the check valve 16.

The tensioner 10 uses a piston 12 sliding coaxially with respect to a cylinder 14. Located between the piston and cylinder are a check valve 16, a piston spring 18, and an optional flow control device 20, creating a conventional hydraulic tensioner function. The cylinder 14 is guided within a bore 34 having an oil feed from the engine directly feeding an oil groove 22. The oil groove 22 is an annulus allowing for consistent oil feed as the cylinder 14 moves, but does not create hydraulic bias on the cylinder sleeve. The oil groove 22 has an oil feed 22a to the center of the cylinder 14. The cylinder 14 has a plug 24 pressed into the end forming the oil reservoir 26 of the tensioner 10. The oil reservoir 26 feeds through the check valve 16. The cylinder 14 operates inside of a bearing 28 having bearing balls 30 located in a counter bore 32 coaxial with cylinder bore 34. The counter bore 32 has a steep taper 36 on which the bearing balls 30 ride. As the cylinder 14 moves in the extending direction, the bearing balls 30 moves out of the counter bore 32 allowing for free movement. As the cylinder 14 moves in the retracting direction, the bearing balls 30 are driven down into the steep taper 36 preventing the cylinder 14 from retracting. A circular clip 38 is retained within a groove in the inside diameter (ID) of the piston 12. The circular clip 38 rides within a groove 40 of given width on the cylinder 14. The width of the groove 40 corresponds to a distance at least equal to the minimum required backlash of the tensioner 10. When the circular clip 38 contacts an outer end wall of the groove 40 during extension, the circular clip 38 pulls the cylinder 14 with the circular clip 38 resulting in endless loop power transmission member slack take-up. Acting between the bearing 28 and piston 12 is a bias spring 42 which serves to bias the piston/cylinder assembly (12/14) out when the circular clip 38 contacts the end wall of the groove 40 resulting in extension and endless loop power transmission member take-up. It should be recognized that the piston/cylinder spring load is always higher than the cylinder/bearing spring load.

A series arrangement of a hydraulic chain tensioner 10 and a ratchet allows for the tensioner 10 to satisfy the function of endless loop power transmission member slack take-up while minimizing changes to the dynamic tuning of the tensioner 10. The tensioner 10 uses a moving member assembly containing the components functioning as a hydraulic tensioner. The moving member is extended only when the hydraulic piston 12 has reached a full stroke position. The movement is controlled by a one way device and is unable to retract taking up endless loop power transmission member slack, moving the hydraulic tensioner, components to maintain a constant tensioner tune over the life of the timing drive. The function is accomplished using cylinder 14 guided by a bore 34. Oil is feed via an annulus 22 to the inside of the cylinder 14. A bearing 28 rides around the cylinder 14 and is located in a tapered recess 36 allowing for extension but not retraction of the cylinder 14. At the exposed end of the cylinder 14 is a piston 12. The piston 12 is biased out by a low preload, low rate spring 42 extending around a circumference and resting on top of the bearing 28. This piston 12 is retained by a spring clip 38 riding in a groove 40 on the cylinder 14. Contained between the cylinder 14 and the piston 12 is a check valve 16, spring 18 and flow control device 20 for performing the hydraulic tensioner function.

The cylinder 14 is fed oil via an annulus 22 to prevent hydraulic forces from contributing to cylinder extension. The cylinder 14 forms a reservoir 26 moving with the tensioner 10. The bearing 28 located on the outside of the cylinder 14 allows for extension of the cylinder 14. When the cylinder 14 is pushed back, the bearing 28 is driven into the taper 36 preventing retracting motion. The spring 42 acting between the bearing 28 and piston 12 act to bias the whole assembly out for endless loop power transmission member take-up. The clip 38 acts to connect the cylinder 14 to the piston 12 pulling the cylinder 14 out when the piston 12 reaches the end of extension travel. The clip 38 also prevents tooth jump by contacting the back side of the groove 40 during shutdown. The check valve 16, spring 18 and flow control device 20 allow for normal hydraulic tensioner function.

The disclosure describes an assembly for take-up of wear in an endless loop power transmission system including a hydraulic tensioner 10 having a piston 12, a cylinder 14, a piston/cylinder spring 18, and a check valve 16 for providing less distance at a full travel stroke than required for take-up of full wear of the endless loop power transmission system. A zero backlash ratchet including a bearing 28 with bearing balls 30, a counter bore 32, a steep taper 36, and a cylinder/bearing spring 42. The zero backlash ratchet is attached in series with the hydraulic tensioner 10 for extending only when the hydraulic tensioner 10 has reached the full travel stroke, thereby repositioning the hydraulic tensioner 10 to continue operation as the endless loop power transmission system continues to wear. In other words, a tensioner is disclosed for an endless loop power transmission made up of a hydraulic tensioner 10 including a piston 12, a cylinder 14, a piston/cylinder spring 18, a check valve 16, and an optional vent/flow control device assembled in series with a zero backlash ratchet, such that when the hydraulic portion of the tensioner 10 reaches full extension of hydraulic stroke the ratchet mechanically re-positions the hydraulic tensioner 10 to account for system wear. The piston/cylinder spring 18, which is in series with the cylinder/bearing spring 42, always provides a higher force to assure that the ratchet only extends when the hydraulic tensioner 10 is fully extended, guaranteeing that a minimum backlash is maintained in the tensioner 10.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A tensioner (10) for an endless loop power transmission member comprising:
   a piston (12) operably engageable with an endless loop power transmission member;
   a cylinder (14) guiding the piston (12) for sliding coaxial movement in a direction of the endless loop power transmission member and defining an oil reservoir (26) for receiving hydraulic fluid;
   a bearing (28) having bearing balls (30) located in a counter bore (32) coaxial with cylinder bore (34), the counter bore (32) having a steep taper (36) on which the bearing balls (30) ride, such that as the cylinder (14) moves in an extending direction, the bearing balls (30) move out of the counter bore (32) allowing free extending movement of the cylinder (14), and such that as the cylinder (14) moves in a retracting direction, the bearing balls (30) are driven down into the steep taper (36) preventing the cylinder (14) from retracting; and
   a circular clip (38) retained within a groove in an inside diameter (ID) of the piston (12), wherein
   the cylinder (14) has a groove (40) of given width on the cylinder (14) in which the circular clip (38) rides, the given width corresponding to an allowable backlash for the tensioner (10).

2. The tensioner (10) of claim 1 further comprising:
   an end wall of the groove (40) coming into contact with the circular clip (38) during extending movement, such that the circular clip (38) pulls the cylinder (14) with the circular clip (38) resulting in endless loop power transmission member slack take-up.

3. The tensioner (10) of claim 2 further comprising:
   a bias spring (42) acting between the bearing (28) and piston (12), the bias spring (42) serving to bias the piston (12) out of the cylinder (14) when the circular clip (38) contacts the end wall of the groove (40) resulting in extension and endless loop power transmission member take-up.

4. The tensioner (10) of claim 1 further comprising: a check valve (16) located between the piston (12) and cylinder (14).

5. The tensioner (10) of claim 4 further comprising: a piston spring (18) located between the piston (12) and cylinder (14).

6. The tensioner (10) of claim 5 further comprising: a flow control device (20) creating hydraulic tensioner functions.

7. The tensioner (10) of claim 1 further comprising: an oil groove (22) formed within the bore (34) of the cylinder (14).

8. The tensioner (10) of claim 7 further comprising: the oil groove (22) formed as an annulus allowing for consistent oil feed as the cylinder (14) moves without creating a hydraulic bias on the cylinder (14).

9. The tensioner (10) of claim 7 further comprising: the oil groove (22) having an oil feed (22a) to a center of the cylinder (14).

10. The tensioner (10) of claim 1 further comprising: a plug (24) pressed into an end of the cylinder (14) forming the oil reservoir (26) of the tensioner (10), the oil reservoir (26) fed through a check valve (16).

11. An assembly for take-up of wear in an endless loop power transmission system comprising:
    a hydraulic tensioner (10) having a piston (12), a cylinder (14), a piston/cylinder spring (18), and a check valve (16) for providing less distance at a full travel stroke than required for take-up of full wear of the endless loop power transmission system; and
    a zero backlash ratchet including a bearing (28) with bearing balls (30), a counter bore (32), a steep taper (36), and a cylinder/bearing spring, the zero backlash ratchet attached in series with the hydraulic tensioner (10) for extending only when the hydraulic tensioner (10) has reached the full travel stroke, thereby repositioning the hydraulic tensioner (10) to continue operation as the endless loop power transmission system continues to wear.

12. The assembly of claim 11 further comprising:
    the piston/cylinder spring (18) located in series with the cylinder/bearing spring (42) and providing a higher force to assure that the zero backlash ratchet only extends when the hydraulic tensioner (10) is fully extended, guaranteeing that a minimum backlash is maintained in the tensioner (10).

13. A tensioner (10) for an endless loop power transmission member comprising:
    a piston (12) operably engageable with an endless loop power transmission member;
    a cylinder (14) guiding the piston (12) for sliding coaxial movement in a direction of the endless loop power transmission member and defining an oil reservoir (26) for receiving hydraulic fluid;
    a bearing (28) having bearing balls (30) located in a counter bore (32) coaxial with cylinder bore (34), the counter bore (32) having a steep taper (36) on which the bearing balls (30) ride, such that as the cylinder (14) moves in an extending direction, the bearing balls (30) move out of the counter bore (32) allowing free extending movement of the cylinder (14), and such that as the cylinder (14) moves in a retracting direction, the bearing balls (30) are driven down into the steep taper (36) preventing the cylinder (14) from retracting;
    a circular clip (38) retained within a groove in an inside diameter (ID) of the piston (12), wherein the cylinder (14) has a groove (40) of given width on the cylinder (14) in which the circular clip (38) rides, the given width corresponding to an allowable backlash for the tensioner (10);
    an end wall of the groove (40) coming into contact with the circular clip (38) during extending movement, such that the circular clip (38) pulls the cylinder (14) with the circular clip (38) resulting in endless loop power transmission member slack take-up;
    a bias spring (42) acting between the bearing (28) and piston (12), the bias spring (42) serving to bias the piston (12) out of the cylinder (14) when the circular clip (38) contacts the end wall of the groove (40) resulting in extension and endless loop power transmission member take-up; and
    a check valve (16) located between the piston (12) and cylinder (14).

14. The tensioner (10) of claim 13 further comprising: a piston spring (18) located between the piston (12) and cylinder (14).

15. The tensioner (10) of claim 14 further comprising: a flow control device (20) creating hydraulic tensioner functions.

16. The tensioner (10) of claim 13 further comprising: an oil groove (22) formed within the bore (34) of the cylinder (14).

17. The tensioner (10) of claim 16 further comprising: the oil groove (22) formed as an annulus allowing for consistent oil feed as the cylinder (14) moves without creating a hydraulic bias on the cylinder (14).

18. The tensioner (10) of claim 16 further comprising: the oil groove (22) having an oil feed (22*a*) to a center of the cylinder (14).

19. The tensioner (10) of claim 13 further comprising: a plug (24) pressed into an end of the cylinder (14) forming the oil reservoir (26) of the tensioner (10), the oil reservoir (26) fed through a check valve (16).

* * * * *